(12) United States Patent
Vissenberg et al.

(10) Patent No.: US 9,655,191 B2
(45) Date of Patent: May 16, 2017

(54) LIGHTING DEVICE AND LIGHTING SYSTEM

(71) Applicant: PHILIPS LIGHTING HOLDING B.V., Eindhoven (NL)

(72) Inventors: Michel Cornelis Josephus Marie Vissenberg, Roermond (NL); Bianca Maria Irma Van Der Zande, Heeze (NL); Lucas Josef Maria Schlangen, Eindhoven (NL); Daniël Willem Elisabeth Schobben, Waalre (NL); Inge Van De Wouw, Tilburg (NL); Leonie Maria Geerdinck, Eindhoven (NL); Remco Adrianus Gerardus Lansbergen, Heeze (NL); Willem Franke Pasveer, Dordrecht (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/762,481

(22) PCT Filed: Jan. 8, 2014

(86) PCT No.: PCT/IB2014/058108
§ 371 (c)(1),
(2) Date: Jul. 22, 2015

(87) PCT Pub. No.: WO2014/115048
PCT Pub. Date: Jul. 31, 2014

(65) Prior Publication Data
US 2015/0373806 A1    Dec. 24, 2015

Related U.S. Application Data

(60) Provisional application No. 61/756,543, filed on Jan. 25, 2013.

(51) Int. Cl.
*H05B 37/02* (2006.01)
*H05B 33/08* (2006.01)
(Continued)

(52) U.S. Cl.
CPC ....... *H05B 33/0851* (2013.01); *F21V 7/0016* (2013.01); *H05B 33/0854* (2013.01);
(Continued)

(58) Field of Classification Search
CPC ............ H05B 33/0851; H05B 33/0854; H05B 33/0872; H05B 37/02; H05B 37/0227
(Continued)

(56) References Cited

U.S. PATENT DOCUMENTS 4,748,547 A     5/1988  Baker
5,231,481 A     7/1993  Eouzan et al.
(Continued)

FOREIGN PATENT DOCUMENTS

CN    202561554      11/2012
JP    2000040407     2/2000
(Continued)

OTHER PUBLICATIONS

"LED Luminaires" www.finelite.com.

*Primary Examiner* — Tung X Le

(57) ABSTRACT

A lighting device comprising a first light source issuing a first beam and a second light source issuing a second beam. Said first and said second light source are dimmable and together issue light with a total light flux. At a mutually equal light flux of the first and the second beam, the glare level of the second beam is lower than the glare level of the first beam. The lighting device further comprises at least one (programmed) controller which, during operation, moderates said dim levels such that in at least a range of the illumination level a ratio of the dim level of the second beam (Continued)

to the dim level of the first beam increases in a gradual manner with increasing total light flux.

17 Claims, 7 Drawing Sheets

(51) Int. Cl.
    *F21V 7/00*     (2006.01)
    *F21S 6/00*     (2006.01)
    *F21S 8/06*     (2006.01)

(52) U.S. Cl.
    CPC ......... *H05B 33/0872* (2013.01); *H05B 37/02* (2013.01); *H05B 37/0227* (2013.01); *F21S 6/008* (2013.01); *F21S 8/06* (2013.01)

(58) Field of Classification Search
    USPC .......................................... 315/151, 152, 291
    See application file for complete search history.

(56) References Cited

U.S. PATENT DOCUMENTS

| | | | |
|---|---|---|---|
| 5,884,994 A | 3/1999 | Herst et al. | |
| 7,631,985 B1 | 12/2009 | Knoble et al. | |
| 8,829,822 B2* | 9/2014 | Laski | H05B 33/0857 315/185 S |
| 8,896,221 B2* | 11/2014 | Esaki | H05B 33/086 315/186 |
| 2001/0022723 A1 | 9/2001 | Siminovitch et al. | |
| 2003/0107323 A1 | 6/2003 | Stam | |
| 2005/0073848 A1 | 4/2005 | King et al. | |
| 2005/0201102 A1 | 9/2005 | Saccomanno et al. | |
| 2006/0087634 A1 | 4/2006 | Brown et al. | |
| 2007/0258243 A1 | 11/2007 | Segall | |
| 2008/0224631 A1 | 9/2008 | Melanson | |
| 2009/0273287 A1 | 11/2009 | Segall | |
| 2010/0213854 A1 | 8/2010 | Rains, Jr. et al. | |
| 2012/0020082 A1* | 1/2012 | Shinohara | F21V 3/02 362/235 |
| 2012/0038291 A1 | 2/2012 | Hasnain | |
| 2012/0091903 A1 | 4/2012 | Bembridge et al. | |
| 2012/0163027 A1 | 6/2012 | Vissenberg et al. | |
| 2012/0206050 A1 | 8/2012 | Spero | |
| 2012/0242242 A1 | 9/2012 | Linz et al. | |
| 2012/0300011 A1 | 11/2012 | Moletti et al. | |
| 2013/0003361 A1* | 1/2013 | Igaki | F21V 29/004 362/184 |
| 2013/0082623 A1* | 4/2013 | Ishikita | H05B 37/0272 315/297 |

FOREIGN PATENT DOCUMENTS

| | | |
|---|---|---|
| JP | 4808746 | 11/2011 |
| KR | 20070081215 A | 8/2007 |
| WO | 2010042216 A2 | 4/2010 |
| WO | 2012143900 | 10/2012 |
| WO | 2013057644 A1 | 4/2013 |

* cited by examiner 25 years    47 years    60 years    70 years    82 years    91 years

LIGHTING DEVICE AND LIGHTING SYSTEM

CROSS-REFERENCE TO PRIOR APPLICATIONS

This application is the U.S. National Phase application under 35 U.S.C. §371 of International Application No. PCT/IB14/058108, filed on Jan. 8, 2014, which claims the benefit of U.S. Provisional Patent Application No. 61/756,543, filed on Jan. 25, 2013. These applications are hereby incorporated by reference herein.

TECHNICAL FIELD OF THE INVENTION

The invention relates to a lighting device comprising at least one first light source issuing a first beam during operation of the first light source, and at least one second light source issuing a second beam during operation of the second light source, and in dependence on dim levels of the respective light sources said first and said second light source together issue light with a variable total light flux and variable illumination levels, and at a mutually equal light flux of the first beam and the second beam, the first beam and the second beam have a respective glare level, the glare level of the second beam being lower than the glare level of the first beam.

BACKGROUND OF THE INVENTION

Such a lighting device is known from US20120163027A1, for example embodied as an indoor luminaire. The intensity distribution of an indoor luminaire is carefully designed to meet conflicting criteria related to a.o.:
 discomfort glare, i.e. disturbing luminaire brightness;
 illumination uniformity, i.e. the even distribution of light at the illuminated area and in the room;
  cost, i.e. the number of luminaires needed, optics type;
  luminaire efficiency; and
  luminaire utilization factor, i.e. the fraction of light of the total issued light on the right spot.

The desired intensity distribution is strongly dependent on the application details. For example, for recessed luminaires a broad intensity distribution is advantageous because it gives an even illumination at a relatively large luminaire spacing. A problem resides in that such an intensity distribution will lead to discomfort glare at higher-flux packages. For this reason, the flux package of a broad intensity luminaire is usually limited or has a higher glare rating classification, and beams with an intensity cut-off at large angles are used in applications where a larger flux package per luminaire is needed. Another example of a design trade-off is the ratio between direct (down) lighting and indirect (up) lighting with suspended luminaires. The direct lighting has a higher utilization factor and saves energy, but the direct light may become glary.

Discomfort glare is a feeling of discomfort caused by working under luminaires which are experienced as too bright, for example due to too bright light or too sharp transitions between dark and light areas in the space of the workplace. The cause and mechanism are not understood well, but the parameters influencing discomfort glare have been studied extensively. The difference in glare may be the result of parameters like the direction of the beam, sharpness of intensity cut-off, size of light-emitting area, sample area (i.e. area where the glare is measured, for example target or task area), etc. Although many measures of discomfort glare have been proposed in the past, the UGR (=Unified Glare Rating) is most widely accepted. The European standard for lighting of indoor workplaces EN-12464-1 prescribes UGR limit values for various working conditions, as well as minimum illumination levels. The UGR is expressed as:

$$UGR = 8\log \frac{0.25}{L_B} \sum \frac{L^2 \omega}{p^2}$$

wherein the summation is over all luminaires in the room, $L_B$ is the background luminance in the room, L is the luminance of the exit window of a luminaire, co is the angular extent of the exit window, and p is the Guth position index, p being relatively small for luminaires in the line of sight and relatively large for luminaires in the periphery of the visual field. In general, a high lumen output of the luminaire will lead to a higher light level in the room (larger $L_B$) but also to a large exit window luminance L. The net effect is a higher glare rating. If the luminance of a dimmable luminaire at dim level a ($0<\alpha<1$) is expressed as:

$$L = \alpha L_{max}$$

The glare increases with dim level according to:

$$UGR = 8\log \frac{0.25}{\alpha L_{B,max}} \sum \frac{(\alpha L_{max})^2 \omega}{p^2} = UGR_{max} + 8\log\alpha$$

The strongest contribution to glare comes from luminaires that are viewed at a small angle to the horizon, because of the orientation close to the line of sight (expressed in the Guth position index) and because the number of visible luminaires is highest in that direction. Therefore, the most common approach to reduce glare is to create an intensity cut-off, such that the luminance of the luminaire in the abovementioned directions is kept low. Another approach is to reduce the overall luminance by creating a large light-emitting surface. This approach is frequently used in indirect lighting.

Light is able to elicit biological, non-visual effects. The effects depend on the time of day and the amount of light and the spectral composition. At night, light exposure suppresses the nocturnal production of the hormone melatonin; this hormone enables consolidated sleep. Light aligns and stabilizes the circadian rhythm and it aligns the sleep-wake cycle with the 24 hr light-dark cycle. Moreover, light exposure improves alertness and mood and can be used to treat depression. The biological effects of light increase with light intensity, and saturate beyond certain light levels. The mood and alertness improving action of daytime light exposure reaches saturation at relatively high illumination levels or light intensities, typically above 1500 lux (measured on a horizontal surface, lux is $lm/m^2$ or $cd \cdot sr/m^2$). Such relatively high illumination levels need not be provided all day, but by providing short periods of bright light or intermittent bright light exposure similar effects result as those achieved after longer pulse durations. When such short, relatively high illumination level periods are realized within indoor lighting systems, care should be given that this does not compromise the visual comfort. High-illuminance lighting systems require special measures to prevent glare discomfort, disability and reflection glare, and unpleasant, uneven light distributions in the room. In addition to the need for high illuminance having positive non-visual effects as a benefit, high illuminance lighting systems are also desired for people with diminished vision due to e.g. the aging of the eye. It is well known that the needs of elderly as regards illumination conditions are stronger than those of young people, with respect to, for example, high intensity, glare-free (including reflection glare), homogeneous lighting distribution (low luminance contrasts in space) and, in the case of vision of fine details, contrast enhancement of, for example, the symbols.

In particular for lighting solutions that are used for general lighting as well as biological light therapy, for example circadian or dynamic lighting systems, a huge variation in light output and consequently intensity distribution is required. Presently, the known dimmable lighting devices have the disadvantage that the intensity distribution of a luminaire/light system is usually optimized for a specific flux package, but that the intensity distribution is not optimal for all dim levels. Another issue is the use of local presence detectors, which often results in the disadvantage of an unbalanced light distribution between dimmed up light at positions where office workers are present and dimmed down light at unoccupied areas. The dimmed-up luminaires have a different flux and a different function than the dimmed-down luminaires.

SUMMARY OF THE INVENTION

It is an object of the invention to provide a lighting device of the type as described in the opening paragraph, in which at least one of the abovementioned disadvantages is counteracted. To achieve this, the known lighting device is characterized in that the lighting device further comprises at least one (programmed) controller which, during operation, moderates said dim levels so that in at least a range of illumination levels a ratio of the dim level of the second beam to the dim level of the first beam increases in a gradual manner with increasing total light flux. An embodiment of the lighting device is further characterized in that the range of illumination levels comprises a first illumination level range and a second, higher, illumination level range of the total light flux, and that in the second, higher, illumination level range a ratio of the dim level of the second beam to the dim level of the first beam increases with increasing total light flux. The lighting device may then be configured such that the controller is activated only in the higher illumination range and only operates after being activated, thereby saving energy and enabling free settings and ratios of the first and the second beam in the lower illumination range. Optionally, in addition, the at least one, preferably (pre-) programmed controller moderates dim levels such that in the first illumination level range the dimming-up pace of the light flux of the first beam is higher than the dimming-up pace of the second beam. Throughout the description, the expression "dimming" is to be understood to mean either increasing (also referred to as "dimming-up" or "boosting") or decreasing the illumination level (also referred to as "dimming-down") or both. The expression "in a gradual manner" can mean both continuously or stepwise. A minimal light level value for the higher illumination range depends strongly on the target group (for example office workers or elderly people) and can be set freely, but for example is in the range of 100 to 700 lux, for example 100, 150, 300, 400, 500, 600 or 700 lux. In EU offices, the applied values typically range from 500 to 700 lux. For the home, lux levels generally are much lower, though light levels at home of least 300 lux or 500 lux find increased appreciation. Thus, advantageous control over the intensity distribution and glare properties is obtained. In the lighting device with at least two separately dimmable first and second beams, the two beams have a different intensity profile or directionality such that they have different glare properties. Instead of the two channels being individually controllable, in the lighting device of the invention the two channels are simultaneously dimmed up and down with a pre-programmed ratio (ranges) of dim levels between the first and the second beam. The low-glare to high-glare dim level ratio increases with increasing overall lumen output, so that the glare of the light as issued from the lighting device is practically constant. The expression "in the second, higher illumination level range a ratio of the dim level of the second beam to the dim level of the first beam increases with increasing total light flux" as recited in the claim is to be understood to mean that at least in a significant part of the higher illumination range, for example from 600 lux to 1000 lux, or from 100 lux to 1200 lux or from 400 lux to 1400 lux, the ratio of second beam to first beam gradually increases with increasing total flux. At a very high light output, for example above 1500 lux or 2000 lux, one of the channels may have reached its maximum level possible, so that the ratio may decrease again then forced by technical limitations.

In an embodiment, at a relatively low illumination level the light flux of the first beam is at least twice the light flux of the second beam and at a relatively high illumination level the light flux of the first beam is less than twice the light flux of the second beam. Typical values of a relatively low illumination level or low flux setting in office applications are to be understood to be light levels not exceeding (about) 650 lux, and a relatively high illumination level or high flux setting is to be understood to be a light level of at least (about) 700 lux. Typical values for elderly people at home are respectively 100 lux and 200 lux with the current lighting solutions. Alternatively, the amount of glare of the lighting device in its environment setting can be adjusted to the needs of the user, for instance while adjusting the light intensity, or based on activity sensing, e.g. low glare for CAD work or reading, and higher glare for brainstorm sessions, or (even) on the eye characteristics of the end user. At a low flux setting, the high-glare first beam is used most, thus taking advantage of the advantageous properties of this beam, like a high utilization factor or good illumination of walls, depending on the type of beam. When the lighting is dimmed-up to higher fluxes, the low-glare second beam is dimmed-up at a higher rate than the high-glare first beam, such that the discomfort glare level is practically kept constant. Thus, the total beam distribution is adjusted towards an optimum distribution for the appropriate flux package.

In terms of the UGR formula described above, the invention may be interpreted as follows:

when the overall light output of the system and hence the background luminance of the room increases linearly by a factor of $\alpha$, the luminance of the beams which are the main contributors to the glare should increase sub-linearly according to $\sqrt{\alpha}$, such that the UGR is (about) constant. In order to generate the right amount of light in the room, a superlinear increase in light output needs to be provided by the beam that has little impact on glare, usually indirect lighting (indirect beam) or lighting focused along the vertical direction (cut-off beam). Hence, an embodiment of the lighting device according to the invention is characterized in that by dimming-up the total light flux by a factor of $\alpha$, the respective light flux of the first (high glare) and the second beam (low glare) is increased according to a predetermined ratio, preferably according to a ratio smaller than $1:\sqrt{\alpha}$, more preferably according to a user-preferred ratio. It is noted that besides UGR other glare measures/standards exist and may be used to determine the light settings.

Thus, the invention comprises a lighting system capable of emitting at least a first and a second beam with intensity profiles with different glare impact, a control means that dims the first and the second beam simultaneously according to a pre-programmed ratio that depends on the overall light output, and a means to set this ratio, i.e. a control means to determine the glare-limiting value. For example, the ratio of the first and the second beam can be adjusted by the end user, so that the amount of glare within the system can be set according to the preferences of the end user, without any changes in overall light output. In an embodiment, all elements are incorporated in a single lighting device, for example a single luminaire. In another embodiment, the lighting device comprises a light sensor or presence sensor or other sensor, such that both the light output and the ratio of dim levels ("glare setting") may also be adapted to other sources of light, like daylight, to presence, or type of activity or time of day, etc., wherein optionally use is made of a plurality of luminaires; such embodiments are also referred to as lighting systems. The data measured by the sensor are inputted into the controller, which handles these data, for example, via a small software program preloaded into the controller to change the settings (yet only within the allowable preset ratio and ranges) of the lighting device.

According to the European standard for lighting of indoor workplaces EN-12464-1, limiting values for the UGR for various working conditions are prescribed: for office lighting a maximum limit of UGR is set at 19. An embodiment of the lighting device is characterized in that below a threshold value of the total light flux, the second light source is in an off-state, preferably said threshold value is in a range of 300-500 lux, more preferably in a range of 380-420 lux. This is a practical consequence of the fact that below a certain light output the glare is low anyway and therefore the low-glare beam is not needed to reach the targeted glare value. This embodiment, in the case of a lighting device with a first, direct beam and a second, indirect beam, has the advantage that its utilization factor, i.e. the fraction of light of the total light issued that is incident on the right spot, is practically maximized as regards the UGR value within the requirements of the European standard EN-12464-1 for lighting of indoor workplaces. However, at said low-glare levels a user is free to choose a high utilization or good ambient lighting. The expression "the light source is in an off-state" means that the light source does not generate light.

An embodiment of the lighting device is characterized in that an increase (dimming-up) of the total light flux causes the correlated color temperature (CCT) of the light beams to decrease. This is actually the inverse of Black Body Locus (BBL) dimming known from conventional lamps. If one of the objects was not to influence glare perception, then usually use would be made of conventional BBL dimming, i.e. when the glare is already controlled by intensity distributions. It is known that the spectral composition of white light has an impact on the perceived brightness. For example, light with a higher CCT is perceived as brighter than light with a lower CCT. Therefore it is envisaged that light with a higher CCT is also considered more glary than light with a lower CCT, for example, complaints about glare from bluish white car headlights are indicative of this phenomenon. In this embodiment, two beams are used which have the same intensity distribution but a different CCT. At low illumination levels, the light is cool white, while the light changes to warm white at high illumination levels, which has the advantage that light from this lighting device is experienced as less glary by end users than conventional (GLS-bulbs) luminaires with an exactly opposite change in CCT. Particularly suitable light sources to be applied in the lighting device of the invention and to set the CCT are solid-state light sources, for example lasers or light emitting diodes (LEDs) emitting white light, or emitting light in one of the (primary) colors red, green, blue and amber.

An alternative embodiment of the lighting device used in homes is characterized in that an increase (dimming-up) of the total light flux causes the correlated color temperature (CCT) of the light flux on the task to be changed by the first light source to enhance the contrast as perceived by the user, while a cozy atmosphere in the space is maintained. Contrast enhancement of the task can be performed by either mixing 430 nm, amber or 410 nm, depending on the individual needs set by the eye degradation factor (e.g. in the case of macular degeneration amber is generally preferred). Yet, at low illuminance levels the CCT is decreased by the second light source with the aid of amber LEDs that are turned on at ambient light levels below 150 lux but preferably below 75 lux to preserve the coziness in the space. Actually the lighting device has four features: high intensity and light distribution, contrast enhancement of the task, and antireflection as achieved by light distribution or alternatively by polarized light.

An embodiment of the lighting device is characterized in that it is a recessed floor luminaire, a recessed ceiling luminaire or a ceiling-mounted luminaire and in that the first beam has a broad angular intensity distribution, like a Lambertian beam, and the second beam is a modified beam with a narrower intensity distribution, said second beam preferably being modified by lens optics or reflector optics, more preferably by micro-lens optics. Ceiling-mounted luminaire means that the luminaire is mounted to and abuts directly against the ceiling with its essentially non-light-emitting backside. In these embodiments, the luminaire is capable of emitting light with a broad intensity distribution, e.g. a Lambertian beam (high glare) for which no beam shaping optics are used, and light with a good cut-off at high angles (low glare) obtained via collimation to create said cut-off. The two beams may mutually overlap to produce a well-mixed overall beam, but they also may differ in angular distribution, beam shape or direction. The two beams may have separate exit windows and can then be generated by conventional means. In a preferred embodiment, the two beams share the same light exit window, such that it is not visible to the end-users, for example office workers, which beam is switched on or off. The two beams may be generated by two LED strings, wherein the LEDs in each string have different beam-shaping optics. The two strings may occupy the same optical cavity, a controlled diffuser plate being arranged at the light exit window to hide the individual LEDs, while the beam shape is maintained so that only limited beam broadening takes place. These embodiments have the advantage that a desired trade-off between UGR and luminaire utilization factor can be chosen such that the UGR stays below the upper limit value of 19, possibly without even being noticed by end users. In the case of recessed luminaires, an embodiment of the lighting device could be further characterized in that the first beam and the second beam have a respective CCT, the CCT of the first beam being higher than the CCT of the second beam. The higher color temperature is then offered by the high-glare beam, more bluish white to the walls and warmer white to the people in the room, simulating daylight from a window, which is experienced as pleasant by end users.

An embodiment of the lighting device is characterized in that it is a suspended luminaire, wall luminaire, or stand-alone floor/table luminaire and in that the first, high-glare sub-beam is created by a direct beam via a down-lighting exit window of the luminaire, while the second, low-glare sub-beam is created by an indirect beam via up-lighting. In general, such luminaires provide both a direct and an indirect beam. Such luminaires enable the creation of many beam shapes by means of conventional optical lenses or reflectors and yet the UGR stays below the upper limit value of 19.

A lighting device emitting two beams with different light distribution has the advantage that the ratio of the two beams can be adjusted by the installer or end user so that the amount of glare within the system can be set according to individual preferences, without any changes in light output (overall dim level). Another option is that the glare setting is determined automatically, based on sensor input, on daylight, presence, activity, etc. To achieve this, an embodiment of the lighting device is characterized in that it comprises at least one ambient feedback sensor. The sensor feedback may be local, from sensors in the lighting device, but the feedback may also come from separate sensors or (other) luminaires and communicated by wire or wirelessly. The lighting device may be autonomous, or the setting may be determined for a group of luminaires in a zone, in a room, a floor, or a whole building. Examples of suitable ambient feedback sensors to be comprised in the lighting device are a light level sensor, a color sensor, a distance sensor, and an occupancy/move/activity sensor for example for sensing TV-watching, reading, socializing. Examples of suitable data entrance facilities to be comprised in the lighting device are USB, internet access, i-Cloud access, App, Bluetooth, HDMI, . . . for inputting at least one of UGR classification data, personal preference data, expert-advised light distribution, image data, CCT, illuminance and contrast enhancement.

An issue with indirect lighting devices, such as luminaires or fixtures, is that the indirect light may cause very bright spots if reflecting objects are positioned too close to the luminaire, like the ceiling, the wall, or a cupboard for example. Another issue is that two or more luminaires may be positioned in such a way that the light adds up to unfavorably high levels in between the luminaires, in case the distance is too small, or to unfavorably low levels in case the distance is too large. Especially for lights on poles for use in the home, the conditions may vary widely and the poles may also be displaced many times. An embodiment of the lighting device is characterized in that the ambient feedback sensor can communicate with at least one adjacent lighting device to align illumination level and/or light uniformity with said adjacent lighting device. Thus, the need for automatic uniformity correction of indirect lighting luminaires is resolved. This holds for uniformity on the ceiling, as well as on the walls and on the "working plane", i.e. the horizontal plane below the luminaire where people do the task for which the light is intended, like reading. Light level feedback sensors and/or distance feedback sensors enable adequate handling of these issues.

The luminaire according to the invention comprises at least two separately dimmable light beams with different angular distributions and/or beam direction, e.g. up and down, beam width, or both. The illuminated area, for example ceiling, walls, floor, etc., is sensed by a photodetector that senses light levels in at least two directions, for example up and down, or centrally above the luminaire and in a wide range around the luminaire. The at least two sensor inputs are used to determine the balance between the at least two dimmable channels, such that a setting close to an optimum setting is obtained. The optimum may be determined by minimizing the luminance non-uniformity, or by reaching a value for the uniformity that is within a prescribed range, for example as prescribed by an eye expert, such as an optician, or eye-related measurements.

Alternatively, the feedback sensor may be a camera or multiple cameras pointing in different directions, or a camera with a fish-eye lens in case a fine-grained uniformity is required. For more coarse-grained solutions, the feedback sensor may be an array of photocells, either positioned in different places/orientations, or placed together with a shared optical element, such that each photocell receives light from different directions. It may be noticed that the different areas require different levels of uniformity. Also, the sensor input from a given direction (e.g. the task area) may be used to control the light in the other directions. In that case, the uniformity of the task area may be optimized at the cost of the uniformity at the ceiling. The luminance contrast ratio between the highest luminance in the space and the task should not exceed 10:3, but preferably should be (about) 1:1, and the spatial transitions between luminance values, if any, should be as smooth as possible. This is particularly important for the illumination of the wall and ceiling in the vicinity of the luminaire where the spot on the wall or ceiling should have a low-luminance edge, preferably an invisible edge, or otherwise a luminance contrast ratio not exceeding 3:1 in the directly adjacent area of about 1 m$^2$.

The invention further relates to a lighting system comprising a lighting device as claimed in any one of the preceding claims, characterized in that it further comprises a smart device, said smart device preferably being at least chosen from a smart phone, a tablet, a computer, more preferably said smart device being uploaded with a user interface App. The smart device can be used as a feedback sensor, and the camera in the smart device, for example phone or tablet, is used to establish the light distribution. The user is provided with an App downloaded on the smart device that may allow registering an 'ideal light distribution' which can be achieved either by manually controlling the luminaires in the environment, or by capturing the light distribution that enters the room during the day. The App may send the preferred light configuration or light output control parameters to the luminaire(s) and may interact with the luminaire(s) to establish the contribution of the individual (groups of) LEDs by switching them off for short durations which may be unnoticeable to the human eye. Or a smart phone can be used as user interface. The user makes a picture of channel one (indirect) and channel two (direct), and optimization of the ratio between indirect and direct channels takes place, for example by running an appropriate downloaded App.

In yet another embodiment, as feedback sensor signals, optimal light distributions may be shared and recommended via social media, which may include filters as a function of age, eye properties, room configuration and luminaire configuration. These feedback signals, when downloaded in the smart device, for example a tablet, can be processed further and, via the tablet, communicated to the lighting device. In this embodiment, the smart device is both a feedback sensor and a user interface. Optimal luminaire configurations may be suggested that are able to render the optimal light distribution and a 'buy now' functionality may be included to order the required luminaires while registering the optimal luminaire settings suggested to be added. Also, the end user may be informed on a 0-100% scale to what extent the ideal lighting distribution can be realized with his/her current luminaires. Finally, this percentage is shown as it may be achieved once the user buys the suggested lighting product(s).

In yet a further embodiment of the lighting system, settings are taken into account that are derived from the power of vision of the end user which may be assessed by a healthcare professional, like an optician, or alternatively they may be established by the user via a self-assessment using software on a personal computer or smart device. The self-assessment software may or may not control the luminaires when establishing the power of vision of the user. The assessment may establish the influence of spectral distribution, which may be reflected in the optimal lighting distribution.

According to an embodiment, the lighting device could measure the reflectance and/or color of the walls when the luminaire is switched on. The luminaire then automatically optimizes its spectrum by dimming/boosting the temperatures of 2700 K and 4000 K, or even higher temperatures, to compensate for the differences in reflection coefficient of walls and ceilings in order to generate the prescribed or preferred lighting conditions to optimize vision.

An embodiment of the lighting device is characterized in that the controller comprises at least a first control part to select (and turn on) the lighting device to operate according to a preset which is selected from a range of presets, and in that the controller comprises a second control part to slightly modify the selected preset within a preprogrammed light setting ratio for said selected preset. The mechanical control part can for example be selected from a switch, a rotary knob, a slider, a touch-screen and can for example be used to control at least one light setting of the direct and indirect beam. Examples of a light setting ratio are light flux/level, light distribution direct/indirect, CCT . . . . Basically, said presets and the light setting ratios can be fixed based upon the application knowledge in offices and with respect to elderly people, but preferably said presets and the light setting ratios are customized for the end user by using input of physiological eye parameters of the end user such as, for example, light perception, color perception, age, eye injury and lens prescription, as obtained by measurements done by experts, for example by an optician. In the case the light sources are LEDs, for example comprising individually addressable LEDs issuing amber light, or LEDs issuing light in the range of 400 nm to 440 nm, the dim level of these individually addressable LEDs can be set to the preferred contrast ratios. In a further embodiment, the optimization of the light distribution also includes mechanical construction parts to change the height and/or orientation of (parts of) the luminaire(s) by the end user.

As the eye matures, elderly need more and more light to read. Extensive research shows that elderly need 3 to 10 times more, and glare-free, light than teenagers. This is due to various factors including the yellowing of the eye-lens as well as the limited ability to dynamically shape the lens. Also, the eye becomes more and more sensitive to differences in lighting intensity between the book, the direct environment and the overall environment. While teenagers for example have no problem reading a brightly lit book within a dark room, differences in intensity can be quite uncomfortable to the aging eye.

Currently, luminaires in the market are of the 'father and son' type to provide high-intensity reading light and/or diffuse indirect light via an uplighter. Uplighters and reading lights are either switched or dimmed separately in state-of-the-art solutions. State-of-the-art user interfaces on 'father-and-son' type products also do not support consumers in creating the required light distribution. The most advanced state-of-the-art solutions have a dimmer for the uplighter functionality and optionally a second dimmer to control the reading light function. While the uplighter in the 'father and son' solution reduces the differences in light intensity at the book vs. the light intensity in the room, careful setting of the light that is produced with the 'father' vs. the 'son' type is required to ensure that contrast differences fall within the acceptable range of the specific consumer with respect to aging of his/her eye. Experiments revealed that the luminance contrast ratio between the highest luminance in the space and the task should not exceed 10:3, respectively, but preferably should be (about) 1:1 and the luminance gradient should be as low as possible. This is particularly important for the illumination of the wall and ceiling in the vicinity of the luminaire where the spot on the wall or ceiling should have a low-luminance edge, preferably an invisible edge, or otherwise the luminance contrast ratio should not exceed 3:1 in the directly adjacent area of about 1 $m^2$.

This embodiment has the ability to create an optimized light distribution via the uplighter and direct (reading) light such that the user receives the amount of light that fits his/her activity, e.g. reading or watching television, based on the aging of the eye as assessed by the optician. The embodiment includes at least two light sources, e.g. a reading light and an uplighter, integrated into the luminaire and which are controlled via a user interface that reflects the optimal settings. For the lighting device this means that the individual dimmers for the uplighter and reading light are replaced by a user interface that allows controlling the amount of light and the desired ratio of indirect:direct lighting, such as the distribution of light on the book and in the room, all within presets and within light setting ranges. Hence, the user interface is made such that an optimal balance between direct light and indirect light is chosen and that an increase in the intensity of the reading lamp automatically also results in an increase in the light output of the uplighter. Preferably, the ratio between direct light or task lamp and uplighter is based upon the illuminance that falls on the task of the two different light sources, and is within 9:1 and 1:9, respectively, but preferably between 5:5 and 3:7.

In a further embodiment, the user interface takes into account the environmental lighting which is measured using integrated light sensors. State-of-the art-methods can be used to separately establish the contribution of the uplighter and the reading light from the other light sources, like daylight or other luminaires. These methods typically make use of rapid switching of the LEDs in the luminaires with a duty cycle and at a frequency that is invisible to the human eye, to allow for assessing the light levels in the absence of light produced by the luminaire itself; the light produced by direct light and that produced by the uplighter are periodically switched-off at a frequency that is invisible to the human eye, which allows the system to determine:

The environmental lighting levels when both the uplighter and direct light are switched off;

The light level when the direct light is switched on while the uplighter is switched off;

The light level when the uplighter is switched on while the direct light is switched off.

Based on these light levels, an optimal light distribution is determined by the system. Besides automatic adjustment of the light levels, the light distribution can also be automatically adjusted by the combination of optics and individually (or group) addressing of LEDs, with certain outputs being based on their environment. In the case that the light sources are LEDs, for example comprising individually addressable LEDs issuing amber light, 430 nm and/or 410 nm, the dim level of these individually addressable LEDs can be set, depending on the dominant eye degradation feature, e.g. Macular degeneration, accommodation, cataract, glaucoma.

Further alternative embodiments are envisaged. For example, a dynamic lighting device or lighting system comprising a plurality of lighting devices, which provides a lighting rhythm where glare can be controlled with respect to time and/or location, without changing the illuminance. This could be used in outdoor (or indoor) spaces to attract or dispel people by means of visual comfort/glare modulation to/from certain areas, while still meeting the applicable light standards in the most energy efficient way. Fields of application of the lighting device, or of a light system comprising at least two lighting devices, include offices, industry, retail, hospitality, healthcare, Light therapy devices, Healwell, school vision, intelligent indoor and outdoor lighting systems, and Sports lighting.

BRIEF DESCRIPTION OF THE DRAWINGS

Further objects and advantages of the present invention are described by means of exemplifying embodiments with reference to the accompanying schematic drawing, in which.

DETAILED DESCRIPTION OF EMBODIMENTS OF THE INVENTION

Figure 1:
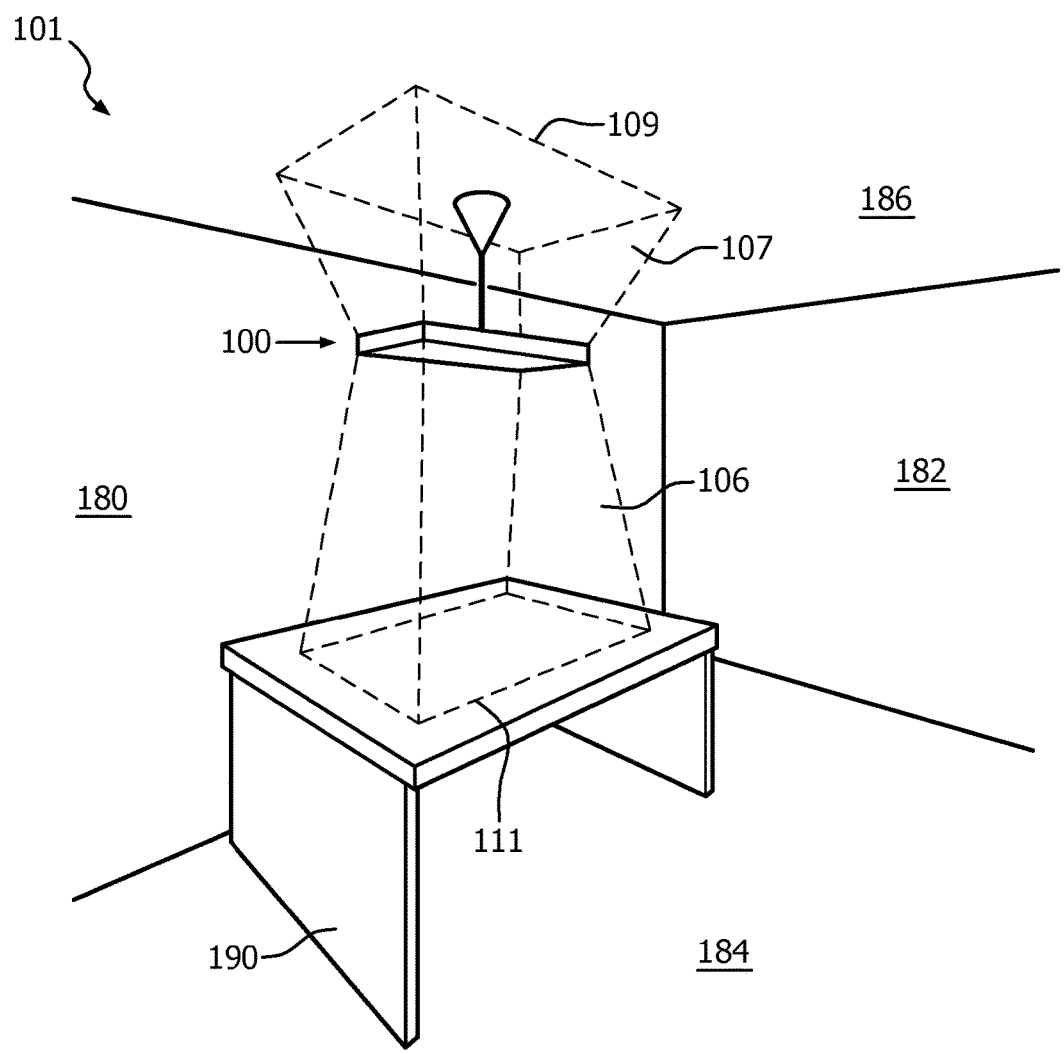
FIG. 1 shows a perspective view of a room provided with a first embodiment of a lighting device of the present invention.

FIG. 1 shows a room 101 provided with a lighting device 100 according to a first embodiment of the invention. The room 101 comprises sidewalls 180, 182, floor 184 and ceiling 186. Furniture including for instance table 190 is arranged at certain predetermined locations on the floor. The lighting device comprises at least one first light source issuing a first, direct beam 106 in a first direction and at least one second light source issuing a second, indirect beam 107 in a second direction. Said first and second light source are dimmable and together issue light with a total light flux. At a mutually equal light flux of the first and the second beam, the glare level of the second beam is lower than the glare level of the first beam. The lighting device 100 according to the present invention comprises a preprogrammed controller (not shown) for controlling the lighting device. Said controller adjusts the light output of the respective light sources such that in a first illumination level range of the total light flux, the dimming-up pace of the light flux of the first beam is higher than the dimming-up pace of the second beam, and that in a second, higher illumination level range, the dimming-up pace of the light flux of the first beam is lower than the dimming-up pace of the second beam. The second light beam 107 in the second direction arrives at area 109 of the ceiling 186, which acts as a reflecting surface. That is to say, the area 109 reflects the light beam 107 and scatters the light throughout the room 101. Due to the reflection, the scattering and/or the dimmer functionality, the second light beam 107 in the second direction provides atmospheric lighting. The first light beam 106 is directed directly downward onto task area 111 of table 190. The first light beam 106 is suitable for lighting articles such as books, merchandise et cetera, and provides task lighting.

The lighting device 100 thus issues a first percentage of light and a second percentage of light. The first percentage and the second percentage can include any percentage between 0 and 100%, for instance 10%, 20%, 30% or 50% per beam. As the lighting device outputs at most 100% of the light emitted by light sources 18, and taking into account possible losses within the lighting device, the sum of the first percentage of the first beam and the second percentage of the second beam will be about 200% or less. The lighting device according to the present invention may thus provide a first light output in the first direction and at the same time a second light output in another, second direction.

Figure 2A:
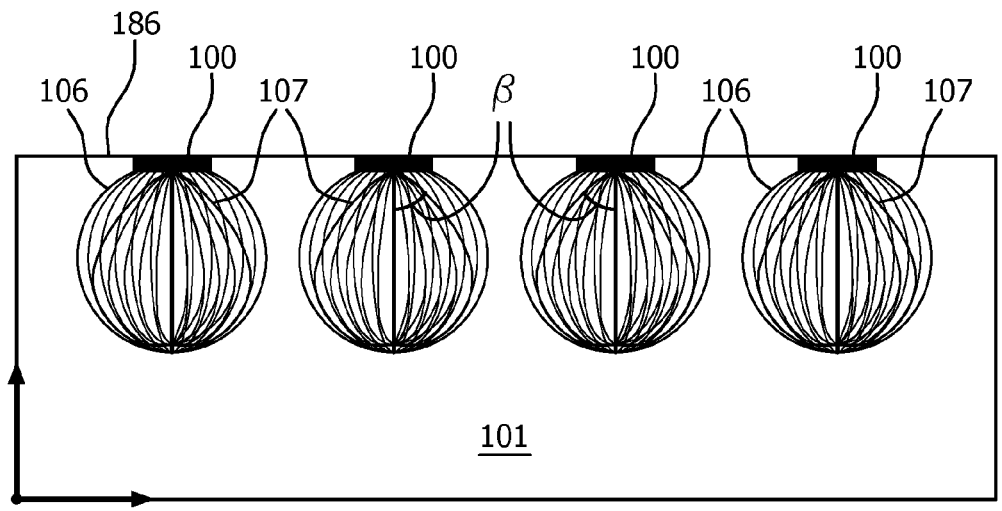
FIG. 2A schematically shows a first and a second beam shape of light as issued from an embodiment of a recessed lighting device according to the invention.

FIG. 2A schematically shows a cross-section of a room 101 illuminated by first beams 106 and second beams 107 as issued from an embodiment of lighting devices 100 according to the invention mounted to ceiling 186. In this embodiment, the luminaire is capable of emitting light with a broad intensity distribution, and light with a good cut-off at large angles, for example angles β larger than 60° with respect to the vertical orientation. In this embodiment, the two beams are generated by two LED strings, wherein the LEDs in each string have different beam-shaping optics per string, i.e. a first string without optics to create a first, high-glare Lambertian beam, and a second string with collimating lenses, for example microlens optics (MLO), to create a second, low-glare cut-off beam. The two strings occupy the same optical cavity and share the same exit window, a controlled diffuser plate being provided at the exit to hide the individual LEDs, while maintaining the beam shape with only limited beam broadening, such that it is not visible to the office workers which beam is switched on or off. The room is 8×8 meters and is illuminated by an array of 3×4 recessed luminaires. The illumination level in horizontal direction at workspace height, i.e. 0.75 m above the floor, is determined, which is a conventional measure used in many standards, as well as the UGR value for an observer sitting in the room. Each luminaire (can) emit a Lambertian beam as well as a so-called MLO beam. Both beams are emitted from a 60×60 cm exit window and both beams contain about 4000 lm at maximum dimmed-up level.

Figure 2B:
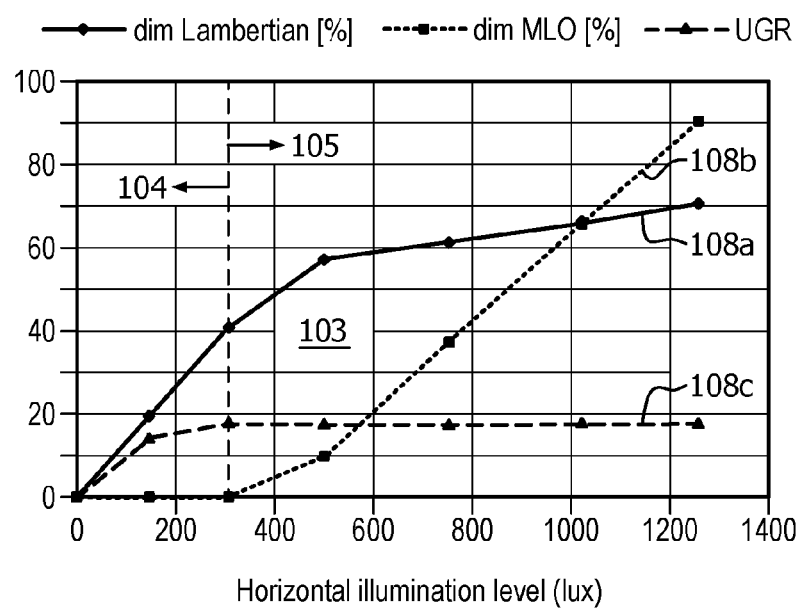
FIG. 2B shows a graph of the dim levels of the first broad (Lambertian) beam and of the second narrow (optically shaped via MLO) beam at different illumination levels in the room.

FIG. 2B shows a graph with curves 108a and 108b for respectively the dim levels of the lighting device of FIG. 2A issuing the first broad (Lambertian) beam and the second narrow (optically shaped via MLO) beam at different light lux levels in the room. The dim levels are chosen such that at the observer's position a maximum UGR of 18 for the UGR-curve 108c is reached; according to the standard EN-12464 the limit for office lighting is 19. The unit of the vertical axis for the dim curves 108a and 108b is a percentage, for the UGR-curve 108c the unit on the vertical axis represents calculated UGR-values. In the graph, a range 103 of illumination levels is shown in which a ratio of the dim level of the second beam to the dim level of the first beam increases in a gradual manner with increasing total light flux. Said range starts at about 300 lux and could be identified as a higher illumination range 105, and the illumination range below 300 lux could be identified as a lower illumination range 104. At lux levels of 300 lux and lower, the Lambertian beam results in a UGR lower than 18. At lux levels of 500 lux and higher, part of the flux has to be delivered via the low-glare MLO beam in order to meet the UGR<=18 criterion. Overall, the "high-glare" Lambertian beam is dimmed up sublinearly to the overall lux level, while the low-glare MLO beam is dimmed up superlinearly, as predicted from the UGR formula. In general, the ratio of the MLO dim level to the Lambertian dim level increases with increasing light output of the system, as shown in the graph below. This is a general feature of the invention.

Figure 3A:
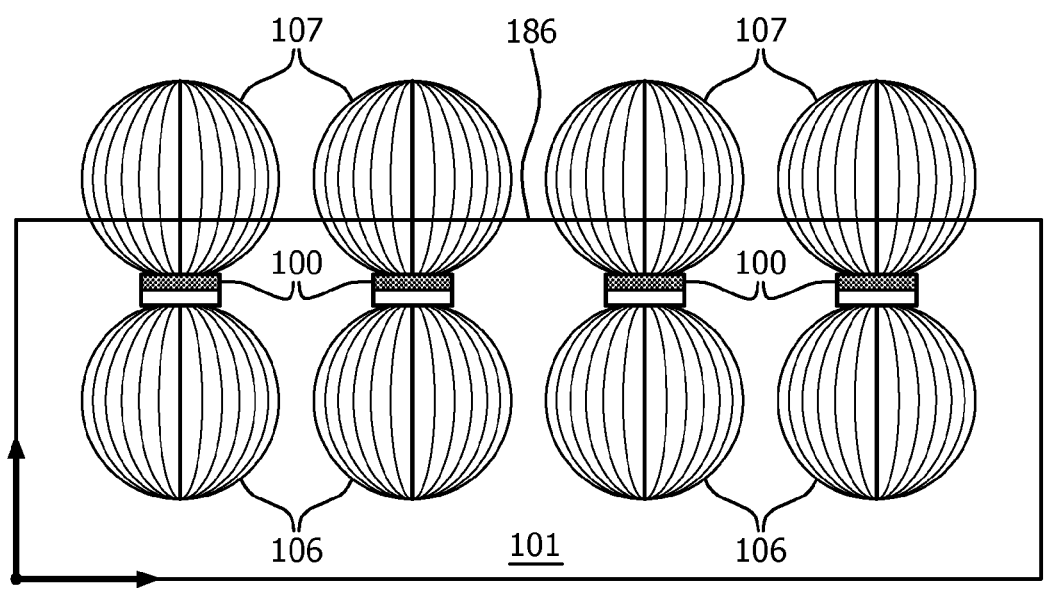
FIG. 3A schematically shows a first and a second beam shape of light as issued from an embodiment of a suspended lighting device according to the invention.

FIG. 3A schematically shows first beam shapes 106 and second beam shapes 107 of light as issued from an embodiment of a lighting device 100 according to the invention suspended from a ceiling 186 of a room 101. In this embodiment, the glary sub-beam is created by the first, direct downlighting beam 106 issued from a downlighting exit window of a suspended luminaire, while the low-glare sub-beam is created by the second, indirect uplighting beam 107. Such luminaires are known and many beam shapes are possible by means of conventional optical lenses or reflectors. In the example below, both up and downlighting beams are Lambertian beams, although any intensity distribution could be used according to the invention. The room 101 is the same as in the previous embodiment.

Figure 3B:
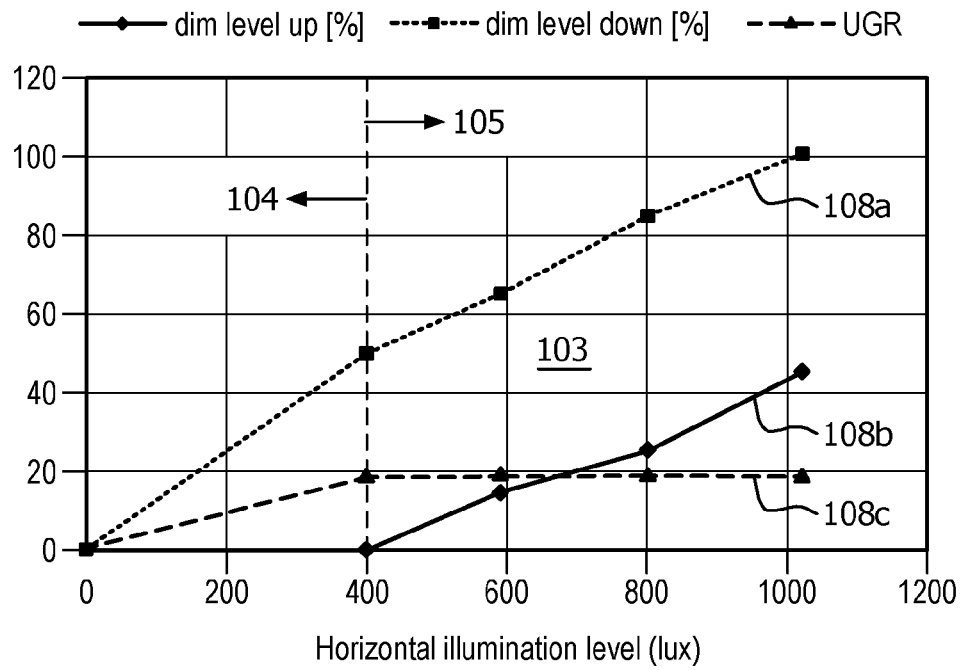
FIG. 3B shows a graph of the dim levels of the first (downlight or direct) beam and of the second (uplight or indirect) beam at different illumination levels in an office room.

FIG. 3B shows a graph similar to the graph of FIG. 2B, but here it shows the dim levels of the first (downlight or direct) beam 108a and of the second (uplight or indirect) beam 108b at different light lux levels in an office room. In the graph, a range 103 of illumination levels is shown in which a ratio of the dim level of the second beam to the dim level of the first beam increases in a gradual manner with increasing total light flux. Said range starts at about 400 lux and could be identified as a higher illumination range 105, and the illumination range below 400 lux could be identified as a lower illumination range 104. The upper limit value for UGR-curve 108c is 19 in this example, which is a suitable limit for the average office worker. This value is reached with direct lighting up to about 400 lux. At higher lux values, an indirect lighting component is needed in order to keep the glare rating at 19. The contribution of the low-glare indirect second beam to the total flux will probably only become predominant over the direct, first beam at values higher than 1500 lux.

Figure 3C:
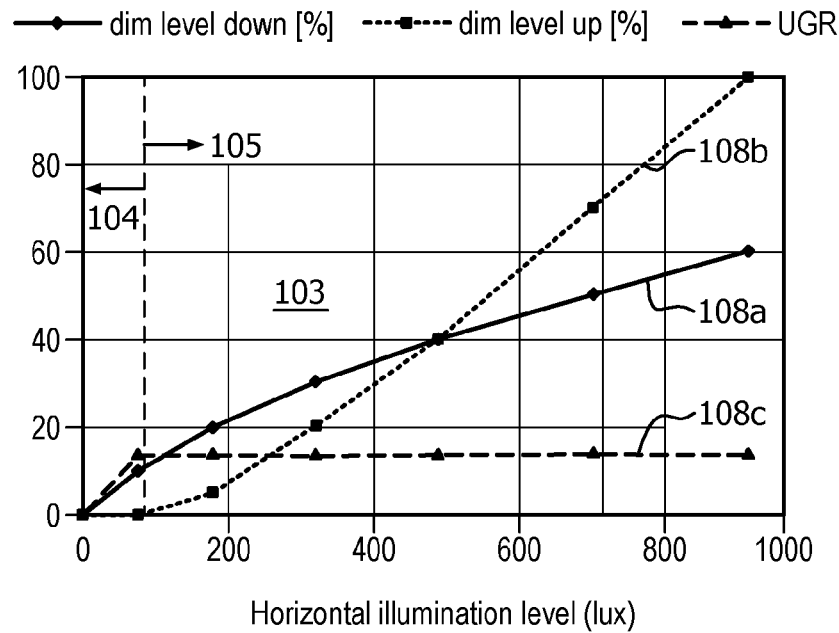
FIG. 3C shows a graph of the dim levels of the first (downlight or direct) beam and of the second (uplight or indirect) beam at different illumination levels in a room for elderly people.

FIG. 3C shows a graph similar to the graphs of FIGS. 2B and 3B, but here it shows the dim levels of the first (downlight or direct) beam 108a and of the second (uplight or indirect) beam 108b at different light lux levels in a room for elderly people. In the graph, a range 103 of illumination levels is shown in which a ratio of the dim level of the second beam to the dim level of the first beam increases in a gradual manner with increasing total light flux. Said range starts at about 100 lux and could be identified as a higher illumination range 105, and the illumination range below 100 lux could be identified as a lower illumination range 104. The value of the UGR-curve 108c should be 16 at the most, but preferably is 14 at the most, as the glare level then renders improved visual comfort for the aging eye. As shown in the figure, a value of UGR=14 is reached with direct lighting already at about 100 lux, hence, in the case of elderly, glare occurs at a much lower lux level than 400 lux, which is the lower value at which glare is experienced by office workers. The contribution of the low-glare indirect second beam to the total flux already is predominant over the contribution of the direct, first beam from about 500 lux and higher.

Figure 4:
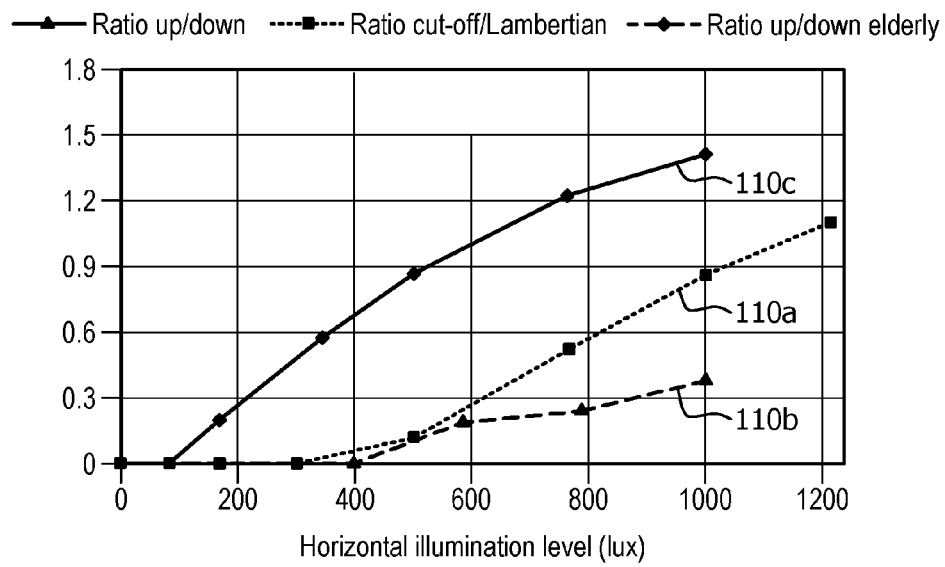
FIG. 4 shows the ratio of the dim level of the second (low glare) beam to the dim level of the first (high glare) beam for both a recessed and a suspended lighting device as a function of the illumination level.

FIG. 4 shows, as a function of the horizontal illuminance level (in lux), the curves 110a-c of the ratio of the dim level of the second (low-glare) beam to the dim level of the first (high-glare) beam for a recessed lighting device, curve 110a, as well as for two cases of a suspended lighting device, i.e. curve 110b for office workers and curve 110c for elderly people. As is shown in the figure, the ratio of the dim level of the second, low-glare, uplighting beam to the dim level of the first, high-glare downlighting beam, increases with increasing overall lumen output. However, the pace of the increase of said ratio strongly depends not only on the target group, for example office workers and elderly people, but also on the type of lighting device, i.e. a suspended lighting device or a recessed lighting device. Said ranges for the ratios provide an optimum balance between the utilization factor of the lighting device and the experienced glare level. Said curves 110a-c only give the lower boundary values of the ratio ranges. Said curves could be higher on the vertical axis, for example by 1 or 2 units, or by a factor of 2. In those cases the glare will be below the boundary value.

According to the figure, the ratio indirect:direct increases with increasing flux and illuminance on the task. The various slopes (or pace) shown in the figure are dependent on the individual comfort level of the user, which is mainly determined by the user's eye quality and the visual task that is (to be) performed. Determinants for eye quality are age, cataract stage, stage of macular degeneration, contrast sensitivity and visual acuity. Claim 11 describes means to set optimal curves for the space the luminaire is used in. In application areas, such as living rooms, variations of the slope can occur as a result of the different reflectivity coefficients people have in their living rooms due to paint and furniture. Sensors as mentioned in claim 9 can be used to set the most optimal curve for the space the luminaire is used in.

Considering the high indirect ratio required for the indirect component, it might be that the lumen output of the indirect component of the product is limited or that it delivers such a high spatial luminance that people do not accept the luminance anymore. If technical limitations arrive, inhibiting the creation of the required indirect illuminance, the direct component can be chosen to increase the illuminance levels at the task. As a result, the ratio indirect: direct will decrease from that point.

Figure 5:
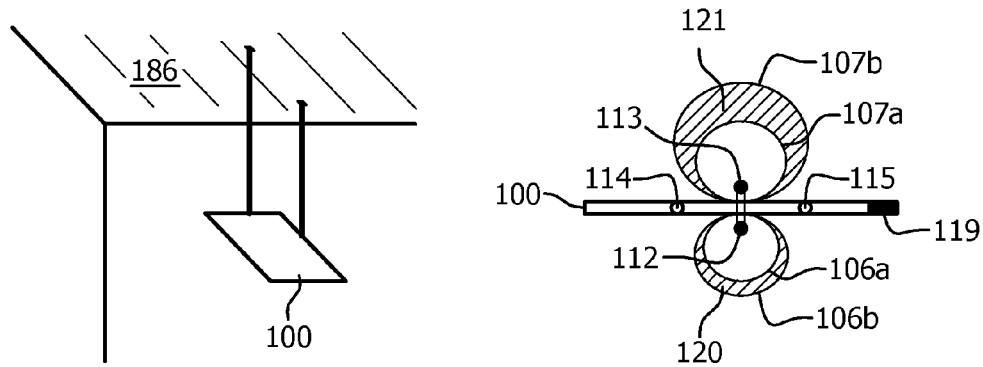
FIG. 5 shows two positions and corresponding light emissions of a lighting device according to the invention suspended from a ceiling.
Figure 5:
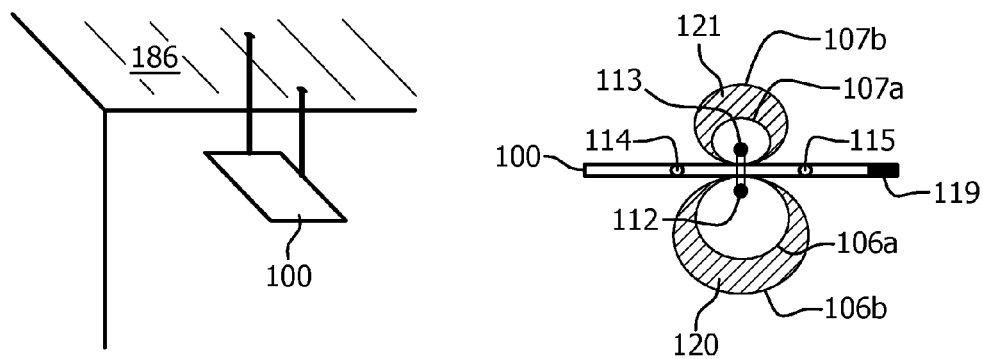

FIG. 5 shows two positions and corresponding light emissions of a lighting device according to the invention suspending from a ceiling. Uniformity of illumination is an important property for indoor lighting systems; the European standard EN-12464-1 prescribes minimum values for the illumination level and illumination uniformity of ceiling and walls, in order to "avoid gloom and raise adaptation levels and comfort of people in buildings". Indirect lighting is a well-known manner of creating uniform lighting conditions. The indirect lighting fixtures may be suspended from the ceiling, or placed on free floor standing poles, or mounted to the walls. A well-known issue with indirect lighting is that the illuminated spot on the ceiling may become disturbingly bright when the distance to the ceiling is too small. In that case, one would like to decrease the non-uniformity of the bright spot by lowering the up/down lighting ratio, or by making the uplighting beam more divergent.

The luminaire 100 according to the invention as shown in FIG. 5 comprises at least two separately dimmable LED light sources, i.e. first light sources 112 issuing first direct light beams 106 and second light sources 113 issuing second, indirect light beams 107, said light beams 106, 107 having mutually different angular distributions, and a mutually different beam direction, e.g. up and down, or beam width, or both. The illuminated area, in this case a ceiling 186, but it could alternatively be walls or a floor etc., is sensed by at least two ambient feedback sensors 114,115, i.e. photodetectors that sense light levels and distances in at least two directions, i.e. up and down, or centrally above the luminaire and in a wide range around the luminaire. The down-sensor 114 and up-sensor 115 provide feedback to controller 119 that is used to determine the balance between the at least two dimmable channels for the first direct beam (downlighter) and the second, indirect beam (uplighter), such that an optimum setting is obtained. The optimum may be determined by minimizing the luminance non-uniformity, or by reaching a value for the uniformity that is within a prescribed range.

By means of the hatched areas 120, 121 with respective boundaries 106a-b and 107a-b, a schematic indication is given of the preprogrammed, limited intensity ranges of the respective light beams for the given position of the luminaire with respect to the ceiling. From these intensities the intensity ratios of the second and the first beam can be determined.

Figure 6A:
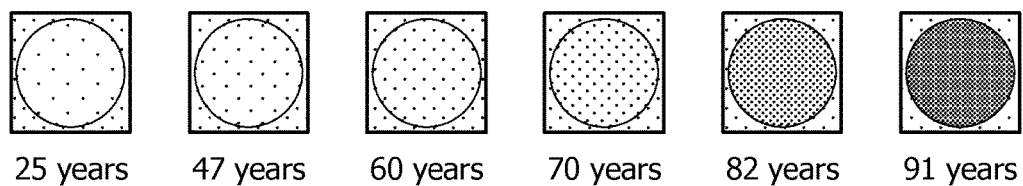
FIGS. 6A-C schematically show the deterioration of the human eye and graphs of its abilities as a function of the lifetime of the eye.
Figure 6B:
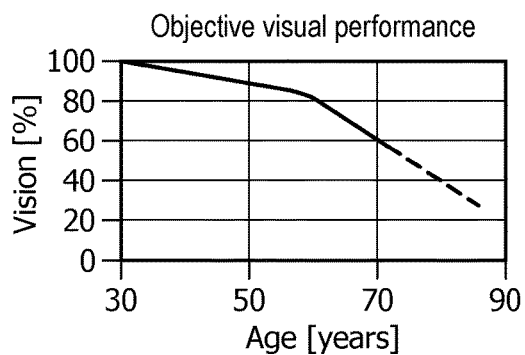
Figure 6C:
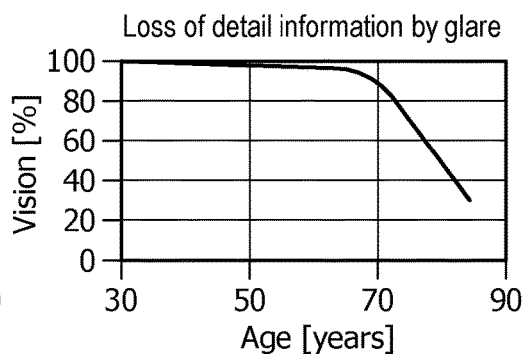

FIGS. 6A-C schematically show the deterioration of the human eye and graphs of its performance as a function of the lifetime of the eye, which deterioration impacts the visual performance and the sensitivity to glare. In FIG. 6A, the yellowing of the human eye in six stages of its lifetime is shown. As shown in the figure, the yellowing progresses during the lifetime of a person and ultimately becomes amber-like. Although multiple processes play a role in the decline of vision, a few should be mentioned in correlation with lighting. Looking at FIG. 6B, the decline starts around the age of 40 due to the decrease of accommodation power of the lens. Solutions to counteract this phenomena are glasses or more light to decrease the pupil diameter and thereby create an increased depth of focus. In addition to the reduction of accommodation power, the following effects contribute to a gradual decrease in vision due to ageing:

Weaker signal reaches the visual cortex. The amount of light incident on the retina of the eye is dependent on the transmittance of the observer's visual system due to the yellowing of the lens. Furthermore, visual performance depends on the quality of the retina, which also deteriorates in the course of ageing. It has been estimated that at the same illuminance striking the front of the eye, a 60-year-old will receive three times less retinal illumination than a 20-year old (Boyce 2006). The reduced signal to the visual system leads to lower visual acuity, which is one of the factors contributing to the declining line in FIG. 6B, and an increased absolute threshold luminance;

Reduction of contrast sensitivity. Low contrast acuity is worsened by age. Changes in both the optics (pupil size, lens transmittance) and (decreasing number of) neurons in the eye are the cause of the reduction in contrast sensitivity with age. Higher lighting levels are required in task areas to enable fine details to be seen (one factor contributing to the declining line in FIG. 6B);

Increased sensitivity to glare: Increased sensitivity to glare is the result of increased scattering of the eye, and a longer recovery or adaptation time, for example due to pupil size, neural adaptation and photochemical adaptation.

FIG. 6C demonstrates the amount of detail people start to loose with age in comparison with a 30-year old.

Figure 7:
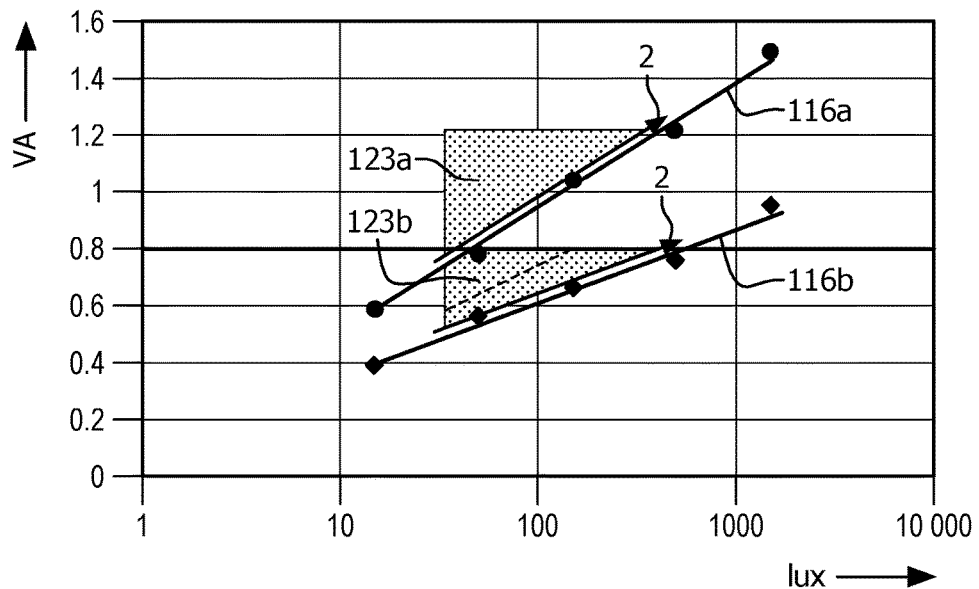
FIG. 7 shows graphs of the visual acuity (ability to see) for middle-aged people and elderly people as a function of the lighting conditions.

FIG. 7 shows graphs 116a-b illustrating visual acuity (ability to see) for middle-aged people and elderly people as a function of the lighting conditions. It is noted that these graphs provide only averaged data, which are based on observations for a large number of people from said groups. Of the graphs shown in FIG. 7, a graph 116a depicts the Visual Acuity (VA) as a function of the illumination level for a first group, middle-aged people of 45 to 55 years old. A VA of at least 0.8 provides comfortable reading conditions to humans. FIG. 7 shows a similar graph 116b for a second group, elderly people of 70 to 80 years old as a function of the illumination level. As shown in the figure, the illumination level required for comfortable reading is much higher for the group of elderly people than for the group of middle-aged people.

FIG. 7 further shows by means of the space, i.e. darkened areas 123a-b, for respectively middle-aged and elderly people, that glare-free lighting as a function of illuminance could offer improved vision, or specifically the ability to see small details. It also shows how the space changes with age. Generally, a higher illuminance allows for better vision, or stated otherwise, smaller details can be distinguished. For comfortable reading this means that people aged 70-80 need at least 500 lux for a VA of 0.8, or more than 1000 lux for a VA=1; preferably this visual acuity is obtained when they read. Currently applied consumer luminaires do not offer this illuminance.

Figure 8:
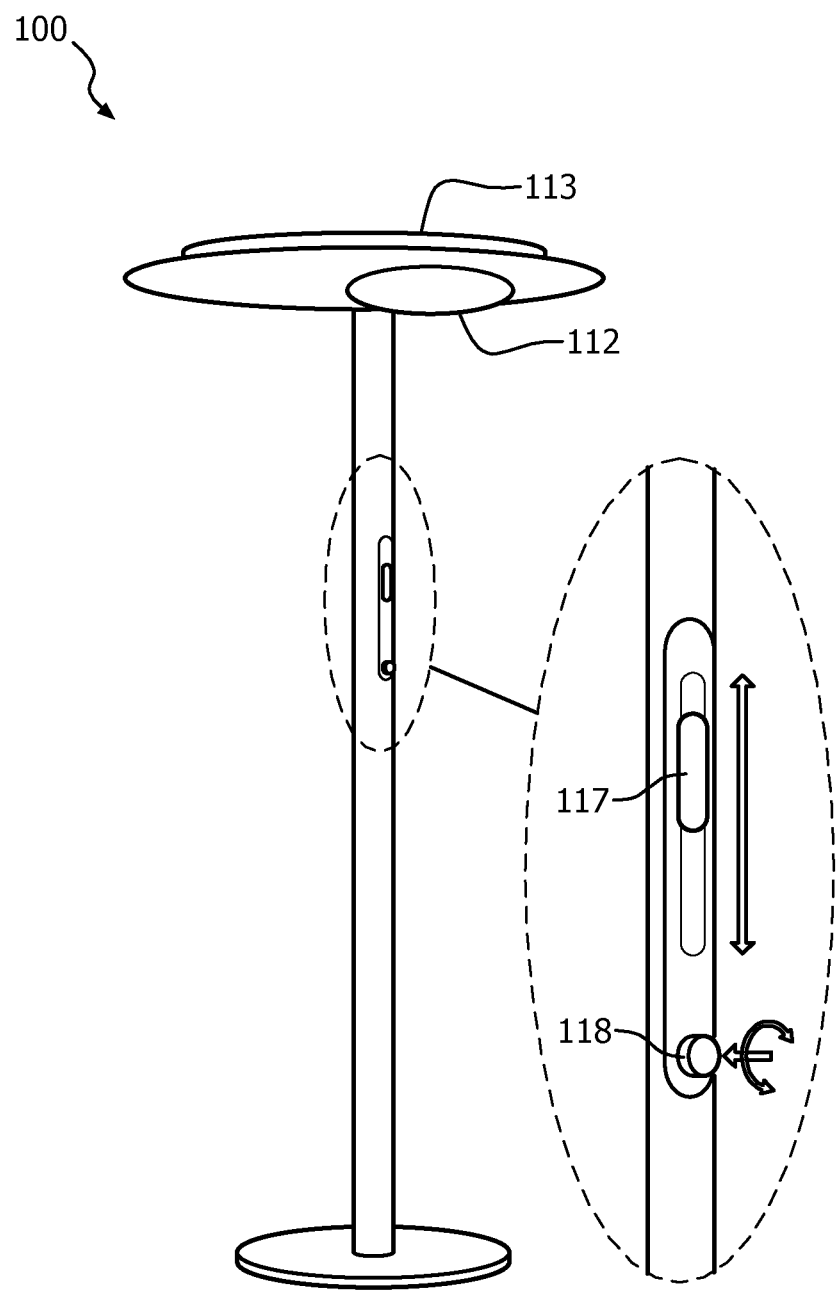
FIG. 8 schematically shows an embodiment of a stand-alone/floor luminaire according to the invention.

FIG. 8 schematically shows an embodiment of a stand-alone/floor luminaire 100 according to the invention, which is used to generate light of high intensities but with low glare properties. The luminaire includes at least two light sources, i.e. a direct, reading light 112 as a first light source and an uplighter, indirect light 113 as a second light source, which are integrated into the luminaire and which are controlled via a first and a second control part that reflect the optimal settings, for example as provided by an optician. The luminaire comprises as a first control part a first user interface, in the figure a rotary button, which enables controlling of the amount of light (light level) and as a second control part a second user interface which enables setting of the desired ratio of indirect/direct lighting for distribution of light on the book and in the room.

The first user interface 117, in the figure a slider, comprises two (pre)programmed light-level control functions, i.e. firstly it increases/decreases the light levels of both the uplighter and the reading light at the same time, and secondly it preferably provides an indication of the advised minimum light level, which could be embodied either by a marker on the luminaire or a tactile feedback that is felt mechanically when shifting the slider. Said indication is based on the assessment of the end-user's eyes, for example as obtained via assessment by an optician, although future models may take into account self-assessment for example.

The second interface 118, in the figure a rotary knob, controls the light distribution (direct/indirect), and comprises two (pre)programmed distribution control functions. Firstly, via the second interface only the light distribution is controlled but the total light level at the position of the (book of the) consumer who sits close to the luminaire is not affected. Secondly, it comprises an indication of the advised light distribution that corresponds to the minimal contrast ratio that is advised for the consumer. Similar to the light level control button, the knob could be embodied either by a marker on the luminaire or a tactile feedback that is felt mechanically when turning the knob. Also here, the indication is based on the assessment of the end-user's eyes.

In this embodiment, the user interface takes into account the environmental lighting which is measured by ambient feedback sensors using integrated light sensors. For this purpose, use is made of rapid switching of the LEDs in the luminaire with a duty cycle and at a frequency that is invisible to the human eye, to enable assessing of the light levels in the absence of the light produced by the luminaire itself. The light produced by the reading light and the uplighter are periodically switched-off at a frequency that is invisible to the human eye, which enables the luminaire to determine:

The environmental lighting levels when both the uplighter and the reading light are switched off;

The light level when the reading light is switched on while the uplighter is switched off;

The light level when the uplighter is switched on while the reading light is switched off.

Based on these light levels an optimal light distribution is then determined by the luminaire.

In an alternative embodiment, the indicated optimal position for the rotary knob and for the slider are not set as customized positions, but instead the optimal position is always at the same mechanical position for each consumer and the software in the luminaire is adapted to make this optimal position match with the corresponding optimal light output and distribution. The additional benefit of this embodiment is that the end user will use the full range of the knobs to vary around the optimal settings rather than using only the bottom or top 10% of the mechanical freedom provided by the user interface.

In a yet further alternative embodiment, the luminaire behavior, light distribution, absolute light level, spectrum, is determined by an optician, based on Visual Acuity and pupil diameter measurements and the luminaire settings are pre-programmed accordingly. To allow for direct-to-consumer product distribution, the desired settings may be entered into the luminaire by the consumer either by using the existing user interface elements, or additional elements, for example small buttons on the back of the product, or Apps on mobile devices. The pre-programmed settings may also include the relation between color temperature of the lighting produced and dim levels or light distribution.

The invention claimed is:

1. A lighting device comprising:
   at least one first light source adapted to issue a first beam during operation of the first light source,
   at least one second light source adapted to issue a second beam during operation of the second light source, and in dependence on dim levels of the respective light sources, said first and said second light source together are adapted to issue light with a variable total light flux and variable illumination levels, and
   at a mutually equal light flux of the first beam and the second beam, the first beam and the second beam have a respective glare level, the glare level of the second beam being lower than the glare level of the first beam, and
   at least one programmed controller which, during operation, is configured to moderate said dim levels in a range of illumination levels,
   wherein the range of illumination levels comprises a first illumination level range and a second, higher, illumination level range, and in that in the second, higher, illumination level range a ratio of the dim levels is configured to increase with increasing total light flux, and
   wherein the at least one programmed controller is configured to moderate the dim levels such that in the first illumination level range the increase of the light flux of the first beam is higher than the increase of the second beam.

2. The lighting device as claimed in claim 1, wherein at relatively low illumination levels the light flux of the first beam is at least twice the light flux of the second beam and at relatively high illumination levels the light flux of the first beam is less than twice the light flux of the second beam.

3. The lighting device as claimed in claim 1, wherein by increasing the total light flux by a factor of .alpha., the respective light flux of the first and the second beam is increased according to a fixed ratio.

4. The lighting device as claimed in claim 1, wherein an increase of the total light flux causes the correlated color temperature of the light beams to decrease.

5. The lighting device as claimed in claim 1, wherein the lighting device is a recessed floor luminaire, a recessed ceiling luminaire or a ceiling-mounted luminaire and in that the first beam has a broad angular intensity distribution and the second beam is a modified beam with a narrower intensity distribution.

6. The lighting device as claimed in claim 5, wherein the second beam being modified by lens optics or reflector optics.

7. The lighting device as claimed in claim 5, wherein the second beam being modified by micro-lens optics.

8. The lighting device as claimed in claim 1, wherein the lighting device is one of a suspended luminaire, wall luminaire, or stand-alone floor/table luminaire and that the first beam is a direct beam and the second beam is an indirect beam.

9. The lighting device as claimed in claim 1, characterized in that it comprises at least one ambient feedback sensor, said ambient feedback sensor preferably being chosen from a light level sensor, a color sensor, a distance sensor, and an occupancy/move sensor.

10. The lighting device as claimed in 9, wherein the ambient feedback sensor can communicate with at least one adjacent lighting device to align illumination level and/or light uniformity with said adjacent lighting device.

11. The lighting device as claimed in claim 10, wherein the controller comprises at least a first control part adapted to select the lighting device to operate according to one preset selected from a range of presets, and in that the controller comprises a second control part adapted to slightly modify the selected preset within a preprogrammed light setting ratio for said selected preset.

12. The lighting device as claimed in claim 11, wherein a light setting ratio between the direct beam and the indirect beam is based upon the illuminance of the two different light sources, said ratio being within 9:1 and 1:9, respectively.

13. The lighting device as claimed in claim 1, further comprising at least one data entrance facility, said data entrance facility preferably being chosen from USB, internet, App, Bluetooth, HDMI, for inputting at least one of UGR classification data, personal preference data, expert-advised light distribution, image data, CCT, illuminance and contrast enhancement.

14. The lighting system comprising a lighting device as claimed in claim 1, further comprising a smart device, said smart device being chosen from at least one a smart phone, a tablet, and a computer.

15. The lighting device as claimed in claim 14, wherein the smart device is uploaded with settings that are derived from the vision capabilities of the end user.

16. The lighting device as claimed in claim 1, wherein by increasing the total light flux by a factor of .alpha., the respective light flux of the first and the second beam is increased according to a ratio smaller than 1.

17. The lighting device as claimed in claim 1, wherein by increasing the total light flux by a factor of .alpha., the respective light flux of the first and the second beam is increased according to a user-preferred ratio.

* * * * *